Sept. 9, 1952      A. G. SCHRAMM      2,609,953

TRAILER LOADER

Filed May 7, 1951

INVENTOR
ARTHUR G. SCHRAMM
BY Scott L. Norvell
ATTORNEY.

Patented Sept. 9, 1952

2,609,953

UNITED STATES PATENT OFFICE 2,609,953

TRAILER LOADER

Arthur G. Schramm, Phoenix, Ariz.

Application May 7, 1951, Serial No. 225,009

3 Claims. (Cl. 214—85)

This invention pertains to trailer loaders.

In the form here illustrated and described, the loader is particularly adapted to loading and drawing heavy objects onto the floor of trailers of the type illustrated in my Patent Number 2,452,267, dated October 26, 1948.

In order to extend the usefulness and efficiency of utility trailers of this type, it has been found expedient to make provision for drawing heavy objects onto the trailer platform or floor. This may be accomplished by a small winch or chain block, but both of these devices add unnecessary cost and additional parts to the trailer. Trailers of the type described having hydraulic body lifting devices, may be changed to provide loading mechanism without separate additional accessories by converting one of the hydraulic wheel operating cylinders into a double acting cylinder so that the piston rod may move out of the guide tube and act as a load moving device.

In view of the foregoing, one of the objects of my invention is to provide a combined hydraulic wheel operating cylinder and piston with mechanism for disconnecting the lifting action and mechanism and converting it into a chain take-up mechanism or tugger which is adapted to draw loads and heavy objects onto the trailer floor bed, or otherwise move them relative to the bed;

Another object is to provide a combination trailer lifting jack and chain take-up mechanism, and Another object is to provide a combination trailer lifting hydraulic jack and chain take-up with a convenient stop and locking mechanism so that the trailer body may be held at any desired height, independently of the hydraulic support, while the hydraulic cylinder is used to operate the loading mechanism.

Other objects will appear hereinafter.

I attain the foregoing objects by means of the devices and combination of parts shown in the accompanying drawings in which.

Similar numerals refer to similar parts in the several views.

Figure 1:
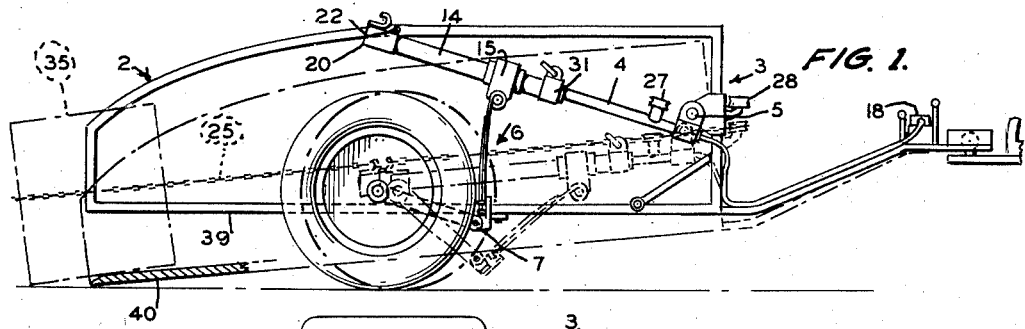
Figure 1 is a side elevation of a trailer including my hydraulic bed lifting and loading mechanism shown in elevated or riding position and with lines of movement shown in dotted outline.
Figure 2:
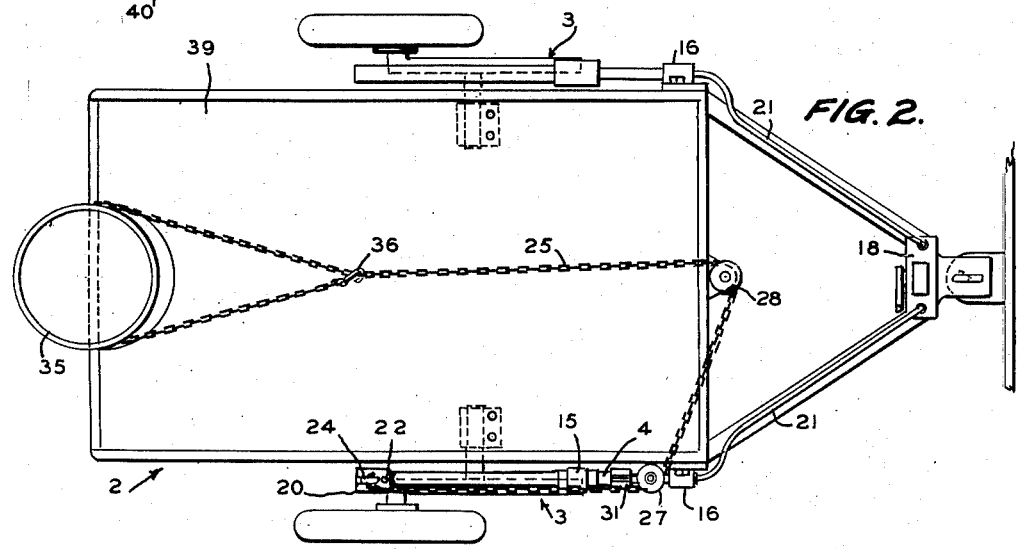
Figure 2 is a plan view thereof.
Figure 3:
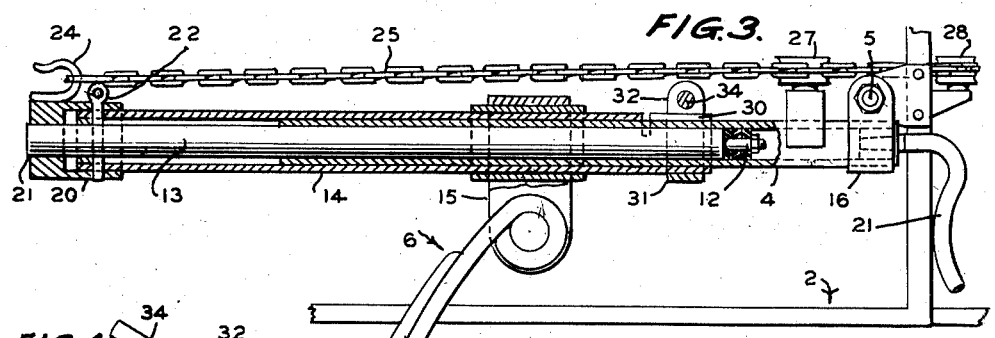
Figure 3 is a vertical mid-section of one of the combination hydraulic trailer lifting jack and loader mechanisms, drawn on an enlarged scale.
Figure 4:
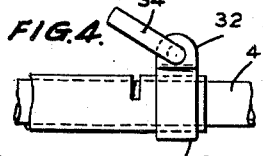
Figure 4 is a side elevational view of the guide tube clamp.
Figure 5:
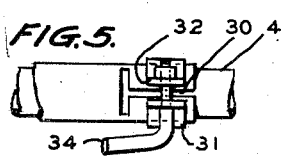
Figure 5 is a plan view thereof.
Figure 6:
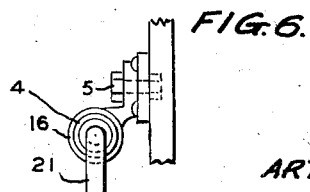
Figure 6 is an end elevational view of the hydraulic cylinder shown in Figure 3.

In the drawings 2 indicates the trailer generally, and 3 similarly indicates the hydraulically operated bed lifting mechanism. It is to be understood that hydraulic cylinders 4 are pivotally attached to the trailer frame at 5 and normally operate the wheel suspension mechanism 6 by lowering wheel crank arms 7.

Each hydraulic cylinder mechanism includes a cylinder 4, a piston 12 operating therein, an outer guide sleeve 14, a spring shackle 15 attached thereto, and the attachment block 16 which is pivotally attached to the trailer frame at 5. Cylinder 4 is supplied with oil forced from the pump mechanism 18 through tube operating into its forward end. Lifting movement is obtained by forcing piston 12 rearward. The outward movement of the piston is transmitted to sleeve 14 which carries shackle 15 by connecting the rear or outer end of the piston rod 13 to the sleeve 14 by means of a chain hook thimble 20, which is welded to the end of the piston rod at 21. This thimble extends over and surrounds the rear end of sleeve 14, and is secured to the sleeve by a removable connecting pin 22 which extends diametrically through holes drilled in the thimble and sleeve, as well as through the piston rod.

A chain hook 24, which opens rearwardly relative to the trailer body, is welded on the top of thimble 20.

A loading chain 25 is secured to hook 24 and extends forward to pulley or sheave 27 in the front part of the trailer body 2. The chain may be looped over this pulley and/or pulley or sheave 28 which is positioned in the middle of the front end of trailer body 2.

When loading the trailer from a platform, it is necessary to maintain the trailer body in an elevated position as shown by the solid lines in Figure 1, after thimble 20 is disconnected from sleeve 14 by removal of pin 22. To maintain this position sleeve 14 is provided with a holding clamp 31. The front end of the sleeve is slotted longitudinally at 30 and enclosed by the clamp body. This clamp has upwardly extending lugs 32 which are drawn together by clamp screw 34. When the clamp is tightened the sleeve is firmly held onto cylinder 4, and relative sliding movement of these parts is prevented. If only one hydraulic cylinder is provided with lifting mechanism the other cylinder may be maintained in elevated position by oil pressure. A valve in its oil supply pipe being used for this purpose.

Whereas I have described but one of the trailer bed lifting mechanisms 3 as being provided with the rearwardly extensible piston, thimble, hook, and clamp it is to be understood that either or both of these mechanisms may be so provided and used for moving loads onto the trailer bed.

In use, chain 25 is attached at its inner end to hook 24, run over sheaves 27 and/or 28, drawn beyond the rear end of the trailer bed 39 and looped around an object 35 which is to be loaded.

Utility hook 36 is used in making the loop. Pin 22 is removed to release thimble 20 and pump 18 operated. The rear motion of thimble 20 carrying hook 24 to which chain 25 is attached will then draw object 35 onto the bed of the trailer.

If the distance over which the object 35 is too great to be drawn onto the trailer bed in one operation, the chain loop is released and shortened, or the chain otherwise shortened, piston 12 is pushed back into cylinder 4 and the chain again attached to hook 24. A further operation of the piston will then advance the load further onto the trailer bed. Lateral positioning of the object 35 can be obtained by using pulleys or sheaves at the corners of the front end of the trailer frame rather than in the center of the frame. If the trailer bed is let down until the rear end rests on the ground as shown by trailer bed fragment 40, Figure 1, the use of clamp 31 is unnecessary and an object 35, may be drawn onto the bed, as above explained and as indicated by the dotted outline of the operating parts shown in Figure 1.

From the foregoing it will be apparent that I have provided an inexpensive and convenient mechanism for loading the trailer by making use of the hydraulic cylinders which are already a part of the trailer lifting mechanism. In connection with this I have provided a simple and effective means for clamping the outer sleeve 14 onto the cylinder and in this way have eliminated the necessity for using latch pins, notches, and the like between these parts.

I claim:

1. In a trailer having an elevatable body and bed supported by wheels mounted on crank arms on each side of said body, each operated by substantially horizontal hydraulic cylinders disposed parallel to the sides of said bed and having pistons or piston rods operating therein and guide sleeves slidably operating on the outside of said cylinders connected to said crank arms, the combination therewith of loading mechanism, including a coupling thimble, having a chain hook, attached to the outer end of said piston rod and extending over and surrounding the outer end of said guide sleeve; a removable coupling pin extending through said thimble and guide sleeve so that said piston rod and sleeve will move together to operate said wheel crank arms, a clamp on the inner end of said guide sleeve adapted to clamp onto the outer surface of said cylinder and retain said guide sleeves on said cylinder in fixed position, a chain having an adjustable loop at its outer end, adapted to run over sheaves on said trailer body and to engage the hook on said thimble at its inner end, and sheaves attached to the forward portion of said trailer body adapted to receive said chain.

2. In a trailer having a bed, a sheave on the forward portion thereof, and hydraulic lifting mechanism therefor including a cylinder, a piston and piston rod operating therein, a guide sleeve operating over said cylinder having a spring shackle attached to the bed lifting mechanism, and a hydraulic pump connected to said cylinder, mechanism for drawing heavy objects onto said trailer bed including a coupling thimble having a chain hook attached to the outer end of said piston rod and extending over and surrounding the outer end of said guide sleeve, a removable coupling pin extending through said thimble and said guide sleeve so that said guide sleeve will be coupled to and move with said piston when said pin is inserted through said thimble and sleeve and will be free to move outward from said cylinder and away from said guide sleeve when said pin is withdrawn, a chain attached to said thimble hook at one end and passing forward over said sheave attached to the forward end of said trailer bed and rearward therefrom with a loop formed at its outer end adapted to engage heavy objects to be drawn onto said trailer bed.

3. In a trailer having a body including a bed supported on crank arms, and having upwardly extending operating springs, the combination therewith of a cylinder having a head pivotally mounted on a forward lateral position of said trailer bed and extending rearwardly substantially parallel to the side of said trailer bed, a hydraulic fluid pressure pump on said trailer bed, connected to said cylinder head, a piston on a piston rod operating in said cylinder, a coupling thimble attached to the outer end of said piston rod, having a rearwardly opening loading chain hook; a guide sleeve slidably operating on said cylinder having a spring shackle on its forward portion adapted to attach to and operate said crank arm spring, and having its rear end removably fitted into said thimble and said sleeve; sheaves on the forward portion of said trailer body, and a loading chain attached to said chain hook on said sleeve, running over said sheaves and having a load engaging loop at its rear end.

ARTHUR G. SCHRAMM.

REFERENCES CITED

The following references are of record in the file of this patent:

UNITED STATES PATENTS

| Number | Name | Date |
|---|---|---|
| 134,019 | Van Emon | Dec. 17, 1872 |
| 1,439,235 | Haase | Dec. 19, 1922 |
| 1,865,105 | Houplain | June 28, 1932 |
| 2,170,932 | Venema | Aug. 29, 1939 |
| 2,321,198 | Graves | June 8, 1943 |
| 2,452,267 | Schramm | Oct. 26, 1948 |
| 2,512,150 | Geren | June 20, 1950 |
| 2,577,246 | Hill | Dec. 4 1951 |